July 2, 1957 T. M. DEAKIN 2,797,678
DIAMOND TRUING DEVICES
Filed June 20, 1955 10 Sheets-Sheet 1

July 2, 1957  T. M. DEAKIN  2,797,678
DIAMOND TRUING DEVICES
Filed June 20, 1955  10 Sheets-Sheet 9

Inventor
Thomas Meyrick Deakin,
By Karl W. Flocks
Attorney

FIG.13.

United States Patent Office 2,797,678
Patented July 2, 1957

2,797,678

DIAMOND TRUING DEVICES

Thomas Meyrick Deakin, London, England

Application June 20, 1955, Serial No. 516,454

Claims priority, application Great Britain June 21, 1954

6 Claims. (Cl. 125—11)

This invention relates to diamond truing devices for truing complex profiles of grinding wheels. A complex profile, for the purposes of this specification, is one which does not have a regular contour throughout—i. e. is not a single plane surface nor a constant radius arc. A complex profile may consist of two or more plane surfaces which are not coplanar—e. g. surfaces which are parallel—or two or more curved surfaces not having a common centre and the same radius, or a combination of plane and curved surfaces, as, for example, where two plane surfaces blend with a small radius.

It is an object of the present invention to provide a diamond truing device whereby the diamond tool is caused to follow a complex profile accurately without the necessity for resetting at each change of contour. A further object is to provide a mechanism which is simple and robust, and has a high degree of flexibility of adjustment for accommodating different profiles.

The present invention, in its broadest aspect, is a diamond truing device for dressing grinding wheels having complex profiles wherein the diamond tool is mounted in a carrier supported from a relatively fixed frame part and adapted to be displaced around the contour of a complex profile through a mechanism comprising a train of relative motion articulators (such as linear or rotary bearings) arranged in series between the fixed frame part and the carrier, each such articulator having a limited freedom of motion appropriate in nature and extent to the desired relative movement between the tool and a respective section of the profile to be traversed thereby, at least all but one of said articulators having associated therewith resilient restraints graduated in intensity in the order in which the articulators are required to become operative during a traverse of the tool over the complex profile, and a common drive for effecting the several motions of the articulators, the said drive being directly engaged with the articulator having the strongest restraint and the reaction thereto being taken by the articulator having the next weaker restraint, the reaction to the resultant effort on the latter being in turn taken by the articulator having the next weaker restraint, and so on through the train of articulators.

One or more of the restrained articulators may have a central or intermediate zero position from which it can be displaced, against spring action, in either sense. The restraint tending to retain such an articulator in its zero position may be constituted by a rotary assembly having two components which are rotatable relatively to a third component, against spring action, away from a fixed abutment defining the zero position and carried by a third component, one of the said two components being connected to the third component by oppositely acting springs and carrying a stop formation engageable, in the zero position, both with the fixed abutment and with a similar abutment on the other of the said two components, the latter component being positively driven from the articulator to be restrained.

Whilst the scope of the present invention is defined in the appended claims, one practical embodiment, which is especially suitable for truing the profile of a grinding wheel in a gear grinding machine, will now be particularly described, by way of illustration only with reference to the accompanying drawings, in which:

Figure 7 is a view on the arrow VII of Figure 5, but showing the parts set for truing the profile of Figure 3a;

Figure 3:
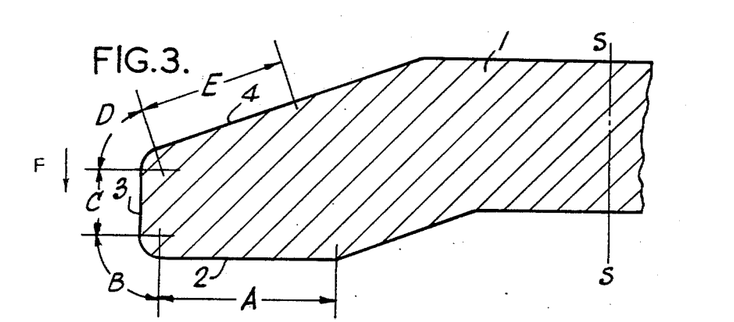
Figures 3 and 3a are fragmentary sections, to a larger scale, of part of the profile of a wheel to be trued, Figure 3 showing the profile appropriate for machining a spherical involute gear and Figure 3a that for machining an octoid gear.
Figures 3A, 10:
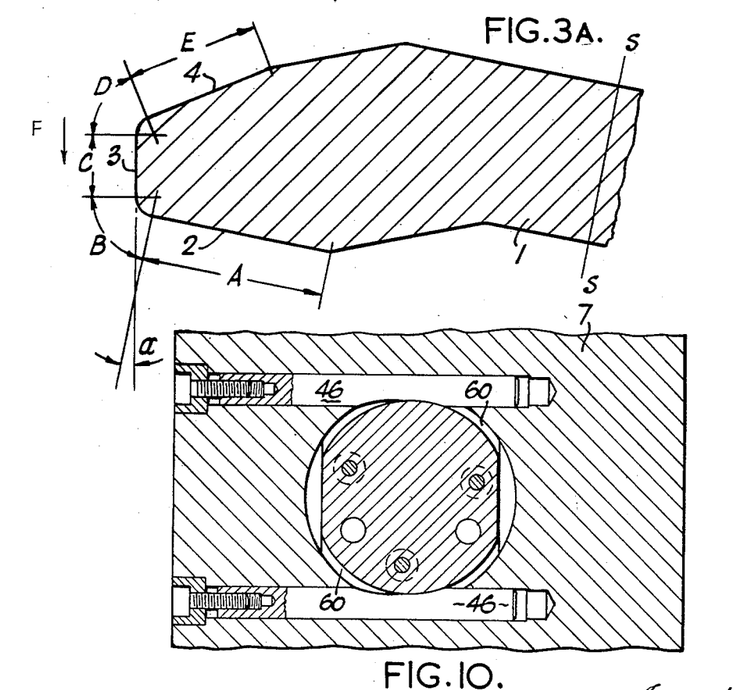
Figure 10 is a fragmentary section on the line X—X of Figure 1.

The drawings show a diamond truing device according to the present invention mounted on a machine having a grinding wheel 1 particularly intended for grinding the tooth flanks of spur or bevel gears, the principal working face being the plane annular surface 2 (Figures 3 and 3a). As the face 2 is trued, it becomes necessary also to true the circumferential edge 3, which is cylindrical for spherical involute gears (Figure 3) and conical for octoid gears (Figure 3a), and the back face 4, which is conical, in order to preserve the correct root contour of each tooth flank of gear blank being ground by the edge 3, and also to maintain the necessary clearance between the back surface 4 of the wheel 1 and the next adjacent tooth of the gear blank. Since the surface 4 is not required, in the case of a gear grinder, to machine a surface of the work, accuracy of contour thereof is unimportant.

The traverse of the diamond truing tool (shown at 5 in Figures 1, 2 and 7) is composed of five consecutive sections, A, B, C, D and E (Figures 3 and 3a), and the construction according to the invention enables the tool to follow this complex profile accurately and automatically in a single stroke in either direction. For this purpose, the tool 5 is adjustably locked in a head or carrier 6 which is articulated to a main supporting bracket 7 slung from the machine frame 8. The articulation is by way of a train of relative motion couplings or articulators comprising rotary bearing assemblies at 9 and 10, and a linear bearing at 11 (see in particular Figures 2 and 6). The rotary bearing assembly 9 permits the tool carrier 6 to pivot about a vertical axis OP relative to a bracket 12 which is in turn supported for rotation about the axis OQ by the rotary bearing assembly 10. The latter is mounted on linear slide 13 which runs on the linear bearing 11. The axis OQ is perpendicular to the axis OP, and is tangential to the wheel 1 where it is engaged by the tool, or parallel thereto at a distance equal to the radius of the fillets at B and D.

The articulator 9 supports an upright stub shaft 14 (Figures 2 and 8) which is keyed to a boss 15 on a rearward extension arm 16 of the tool carrier 6. The stub shaft 14 is extended upwards at 14a with a reduced diameter, and its upper end is steadied in an inverted cup-shaped cap 17 which is clamped by pillars 18 to the bracket 12. The extension arm 16 is formed with a similarly dimensioned cup 19 which faces the cup 17, and is coaxial with it. These cups 17, 19 constitute two components of a resilient restraint on the bearing assembly 9, a third component 20 being freely mounted on the shaft 14a between the upper and lower cups. This third component is a spring carrier and has upper and lower annular recesses 21, 22 respectively, which house spiral springs 23, 24. The one end of each spring is anchored, at 25, 26 respectively, to the adjacent cup 17 or 19 and the other end by a common pin 27 to the spring carrier 20.

Figures 9, 14:
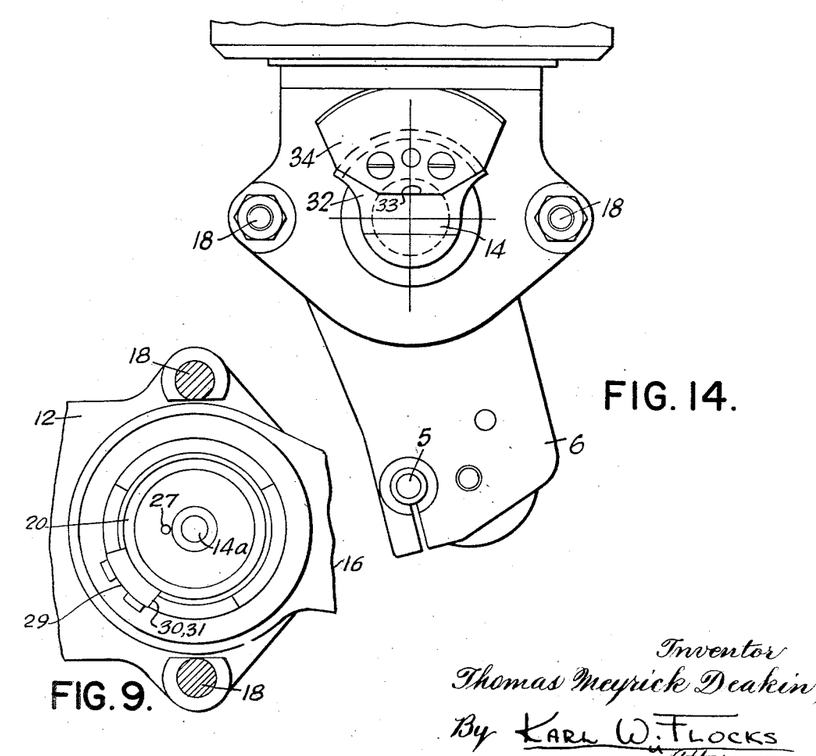
Figure 9 is a fragmentary view on the line IX—IX of Figure 1.
Figure 14 is a scrap under-plan view taken on the arrow XIV of Figure 7.

The spring carrier 20 has a stop 29 (Figures 1 and 9) secured to its circumferential surface which is simultaneously engageable with two normally aligned abutments 30, 31 (Figure 9) on the upper and lower cups 17, 19 respectively. The springs 23, 24 are arranged so that the stop 29 is normally held against the abutment 30, and the abutment 31 is normally held against the stop 29.

The lower end of the stub shaft 14 has an offset head 32, recessed on its underside at 33, to which is secured a bevel gear sector 34 with which meshes a bevel pinion 35 carried on a shaft 36 coaxial with the axis OQ and running in bearings 37, 38. The bearing 37 is located in a socket 39 formed in a flange 40 which is integral with the bracket 12. This flange is bolted to a face plate 41 having a central boss 42 surrounding the shaft 36 and carrying the inner race 43 of a taper roller bearing constituting one part of the bearing assembly 10. The bearing 38 is carried in a fixed block 44 bolted to the linear slide 13, the other race of the linear bearing 11 being formed on a mounting 45 which is adjustably clamped at 46 to the main supporting bracket 7.

The face plate 41 carries a ring gear 47 which meshes with a spur gear 48 formed on the outer circumference of a cup 49 which corresponds to the cup 19, and constitutes one component of a second resilient restraint acting on the rotary articulator represented by the bearing assembly 10. The opposed cup 50 is formed on the slide 13, and the intermediate spring carrier 51 has limited angular freedom of rotation between the cups 49, 50 on a shaft 52 locked in a bracket 53 and the slide 13 and a bracket 53 on the slide. The limits of rotation are preset in dependence on the angular extent of the radius fillets B and D. The construction of the assembly 49 . . . 51 is identical with that of the restraint assembly 17 . . . 20 in all the essential features, but the coil springs in the spring carrier 51 are weaker than those in the spring carrier 20. In the second assembly, the cup 49 is rotated on the shaft 52 by the ring gear 47 when the tool carrier 6 is swung about the axis OQ, this rotation being opposed by the springs in the spring carrier 51. Coacting stop and abutment elements 29a and 30a, 31a, respectively, limit this rotation in identical manner to their counterparts 29, 30, 31 described above.

Figure 11:
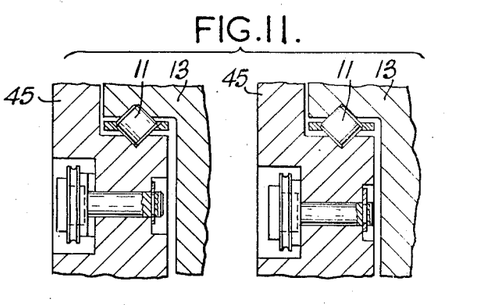
Figure 11 shows companion scrap sections on the lines XI—XI of Figure 12.
Figure 12:
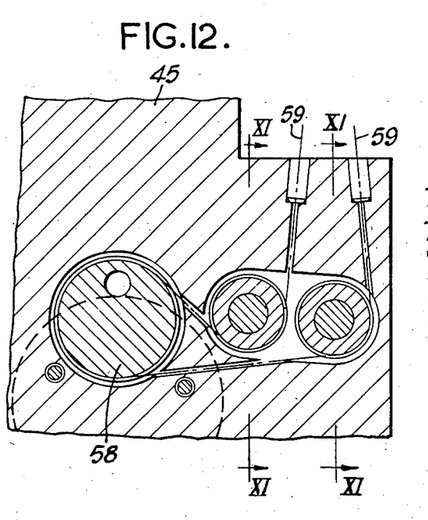
Figure 12 is a fragmentary section on the line XII—XII of Figure 2.

The inner end of the shaft 36 has keyed thereto a spur gear 54 meshing with a pinion 55 carried on a shaft 56 running in bearings 57 in the slide 13. The other end of the shaft 56 carries a drum 58 adapted to be rotated by bands or Bowden cables 59 (Figures 11 and 12) anchored to the circumference thereof. These bands or cables are taken to a tool traverse driving head located at some convenient position on the machine.

The clamping arrangements indicated at 46 (Figures 2 and 10) includes a conical trunnion 60 which is secured to the mounting plate 45 which in turn serves to attach the entire diamond truing mechanism to the main supporting brackets 7 on the machine. This conical trunnion 60 is concentric with the axis OQ, so that the entire mechanism can be rotated about the axis to vary the angle between the direction of travel of the slide 13 and the plane of the wheel 1 so as to determine the conicity of the surface 3 over the section C of the profile.

Referring to Figures 3 and 3a, the grinding wheel 1 rotates on an axis S to which the wheel face 2 is always normal. When machining a spherical involute gear tooth profile, which has zero pressure angle, the surface 3 of the wheel over the section C is cylindrical, as shown in Figure 3, whilst when machining an octoid gear tooth profile, which has a pressure angle $\alpha$, the surface 3 is conical with a cone angle equal to twice the pressure angle.

Figure 4:
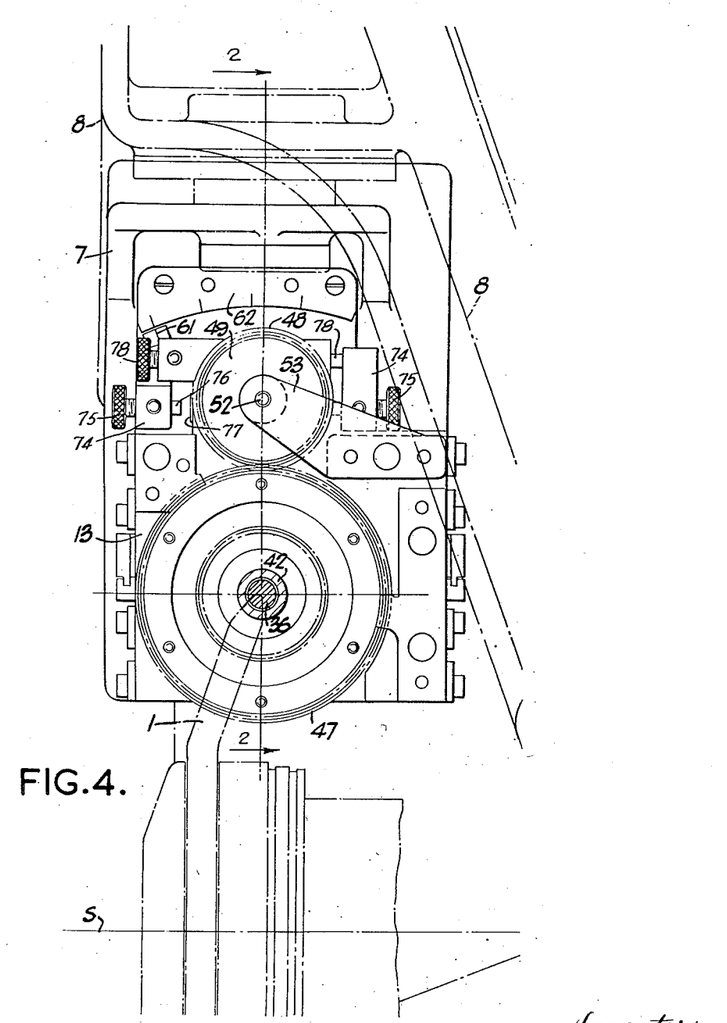
Figure 4 is a sectional end elevation on the line IV—IV of Figure 2.
Figure 6:
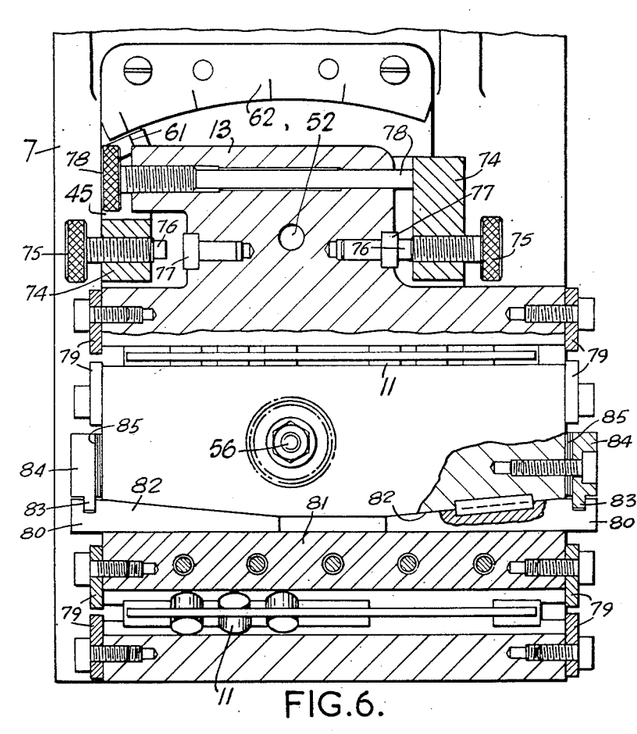
Figure 6 is a fragmentary end view of the linear slide articulator showing the parts set for truing the profile of Figure 3.
Figure 7:
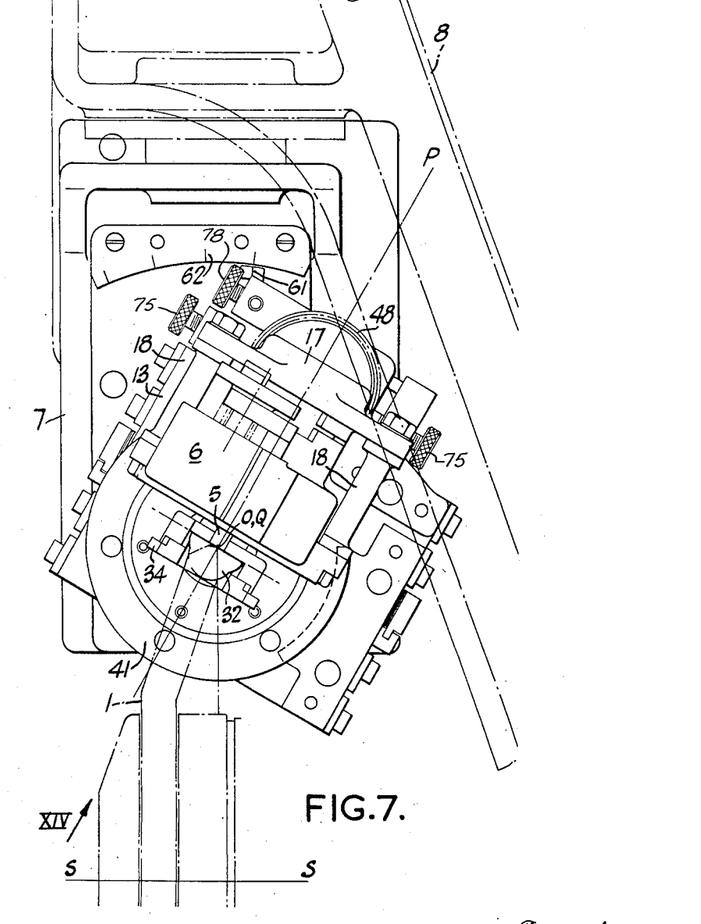
Figure 13:
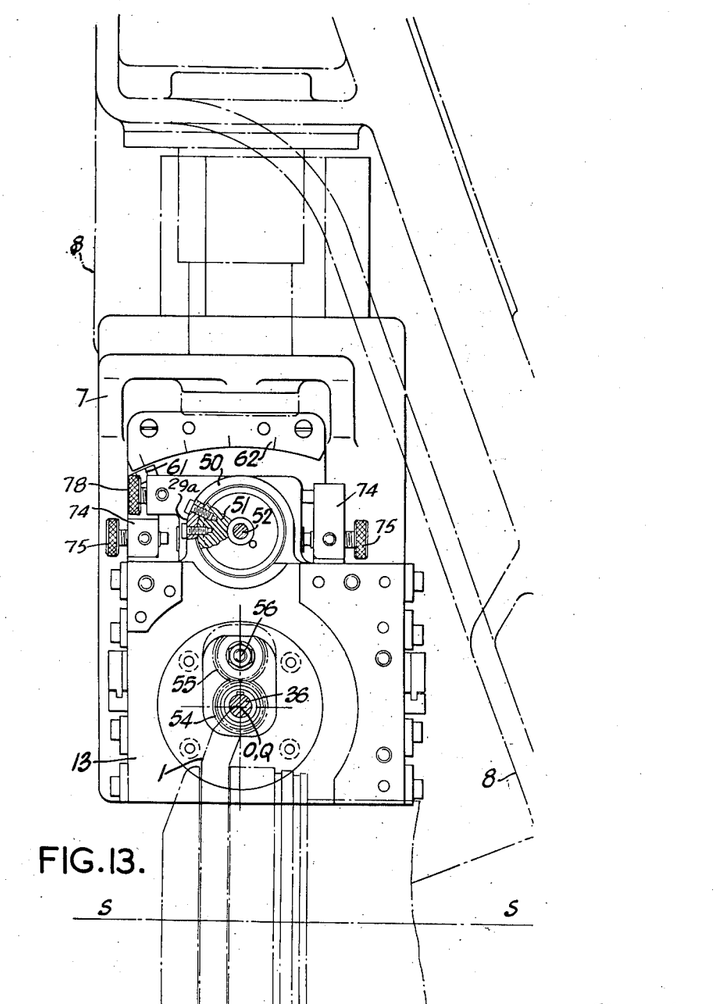
Figure 13 is a view similar to Figure 4 of the parts of the device when the wheel has worn down to its wear-down limit.

In order to facilitate the proper angular setting of the truing tool 5 for any given pressure angle, the mounting plate 45 has an index 61 (Figures 4, 6, 7 and 13) on its upper edge which registers with an arcuate scale 62 struck about the axis OQ and fixed on the face of the main supporting bracket 7. Figures 4, 6 and 13 show the mechanism set for truing the profile of a spherical involute grinding wheel, whilst Figure 7 shows it set for truing an octoid gear grinding wheel profile where the pressure angle is 15°.

Figure 5:
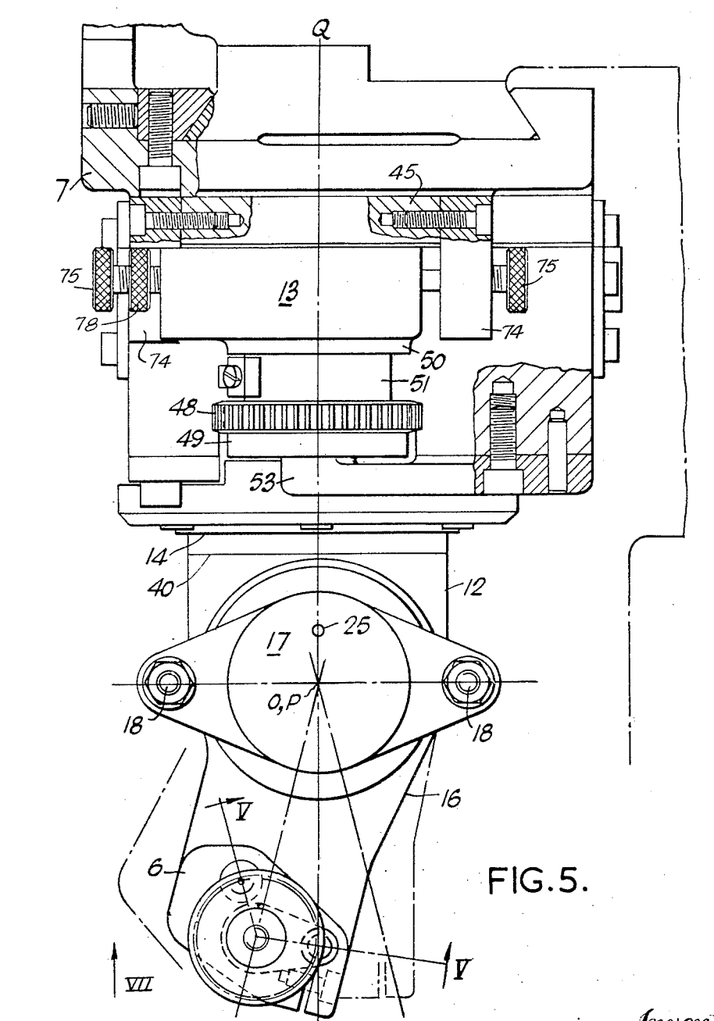
Figure 5 is a plan view of the mechanism of Figures 1 and 2.
Figure 5A:
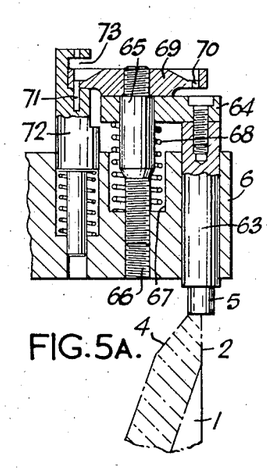
Figure 5a is a section on the line V—V of Figure 5.

Figure 5a shows one construction of mechanism for locating the diamond truing tool 5 axially. The tool tip 5 is brazed or welded into one end of a cylindrical pillar 63 whose other end is clamped to a bridge piece 64. The latter is drilled to a running fit on a plain cylindrical portion of a tool setting stud 65 whose lower end is threaded to work in a corresponding tapped bore 66. The upper end of this bore opens into a recess 67 which houses the lower convolutions of a coil compression spring 68. This spring bears against the underside of the bridge piece 64, and the latter in turn abuts against a tool setting knob 69 screwed onto the upper end of the stud 65. The knob 69 has two or more equiangularly spaced holes 70 adjacent its periphery with each of which is engageable a locking pin 71 fixed in a plunger 72 so as to project into a notch 73 which accommodates, with clearance axially of the plunger, the rim of the knob 69. The plunger 72 is spring loaded to urge the pin 71 into engagement with a hole 70 in the knob.

By depression of the plunger 72, the pin 71 is withdrawn from a hole 70 in the knob 69, and the latter can be rotated. This causes the stud 65 to rise or fall, according to the direction of its rotation; if it rises, the spring 68 forces the bridge piece 64 to rise and so retracts the tool 5; if the stud 65 falls, it forces the bridge piece 64 down and advances the tool 5 into the work. When the required tool adjustment has been made, the locking pin 71 is allowed to re-engage the appropriate hole 70 to lock the tool 5 in its desired setting.

Fig. 6 illustrates details of the adjustable limit stops for the traverse of the linear slide 13. The mounting 45 has a pair of forward-projecting lugs 74 carrying opposed adjustable stop screws 75. The screws have hardened tips 76 which engage hardened anvils 77 in the slide 13. An additional setting screw 78 is threaded into the slide 13 and can abut at its free end one of the lugs 74, and can be employed for centering the slide 13 during, say, initial setting of the tool 5 without the necessity of moving the limit stops 75.

Fig. 6 also shows how the linear races 11 are locked in position by means of keep plates 79, whilst even pressure at each end of each linear bearing 11 is ensured by inserting wedges 80 between the upper surface of a rectangular bedding block 81 resting on the upper race of the lower bearing 11, and respective oppositely tapered surfaces 82 on the slide 13. The outer end of each wedge 80 is notched to receive a tongue 83 on a keeper 84, shims 85 being placed behind each keeper as required so as to hold the wedges in their adjusted positions.

The rotary articulators represented by the bearing assemblies 9 and 10 and the linear articulator represented by the linear bearing 11 constitute a series articulation between the tool carrier 6 and the main supporting bracket 7 on the machine frame. The bearing assembly 9 permits an arcuate traverse of the diamond tool 5 over the front and back faces 2, 4 respectively of the grinding wheel, the extent of angular motion at the bearing being sufficient to permit the tool 5 to sweep the sections A and E (Figures 3 and 3a) of the complex wheel profile. The bearing assembly 10 permits the angular traverse of the tool 5 over the radius fillets B and D of the complex profile, whilst the linear bearing 11 permits the linear traverse of the tool 5 across the peripheral section C of the profile. The various stops in the mechanism are, of course, preset to limit the tool traverse in accordance with the appropriate dimensions of the several sections of the wheel profile.

When the tool is to perform a truing operation, and assuming that the spring carriers 20, 51 are in their respective zero positions so that the tool is on the section C of the profile, a forward driving torque is applied to the drum 58 in the sense for displacing the tool 5 in the direction F (Fig. 3 or 3a). This tends to rotate the shaft 36, which in turn tends to drive the gear sector 34 and swing the tool carrier 6 about the axis OP. The torque on the stub shaft 14 is applied through the cup 19 and spring 24 to the spring carrier 20 in the sense for rotating the carrier anti-clockwise in Figure 9. The stop 29 on this carrier, however, is already in engagement with the abutment 30 on the fixed upper cup 17, so that the carrier cannot move in this direction. Rotation of the stub shaft 14 is thus resisted by the torque of the spring 24, and the reaction to the input torque on the shaft 36 is taken by the sector 34, which tends to rotate bodily about the axis OQ, and is transmitted to the bracket 12 and ring gear 47, and thence to the cup 49.

A similar process of restraint to rotation about the axis OQ takes place in the weaker restraint assembly 49 . . . 51, and rotation of the shaft 36 is again resisted. The gear 54 thus experiences a lateral reaction thrust which is transmitted by the bearings 38 to the linear slide 13, and the latter is displaced to the limit of its travel in the direction of this thrust. This displacement, in the example illustrated, is insufficient to materially affect the meshing of the pinion 55 and gear 54.

When the slide 13 has executed this linear displacement, the tool 5 is located, say, at the junction of the sections B and C of the complex profile (Figure 3). If the input torque is maintained on the drum 58, the reaction at the bevel sector 34 overcomes the spring torque exerted on the spring carrier 51 in the weaker restraint assembly 49 . . . 51, and the bracket 12 rotates about the axis OQ through 90° to move the tool 5 around the fillet radius section B of the wheel profile. At the end of this further travel of the tool 5, however, the stop on the spring carrier 51 engages the appropriate abutment on the fixed cup 50, and the full input torque is now applied to the stub shaft 14. This is sufficient to overcome the resistance of the spring 23 (Figures 2 and 8) and allow the arm 16 to swing about the axis OP. This movement is sufficient to carry the tool 5 over the working face 2 of the wheel for the full extent of the section A of the complex profile to be trued. The tool has thus traversed sections C, B and A automatically in correct sequence.

If the tool 5 has been correctly set at the commencement of this traverse, the sections C, B and A have now been trued. The tool may, however, have been left clear of the work in order to enable it to be set to a gauge adjacent the start of section A for truing the working face of the wheel 1 on its return traverse. Assuming, therefore, that the tool 5 is now at the start of section A of its traverse, the spring 23 is under maximum tension, and the corresponding spring in the carrier 51 is also at its maximum, though lower, tension, in which state it is held by reaction from the stronger spring. If, therefore, the drive to the drum 58 is reversed, the tool is first swung by the spring 23 about the axis OP to true the working face 2 of the wheel 1, the spring in the carrier 51 being maintained taut until the spring 23 has returned its carrier 20 to the zero position.

At the end of the section A, the stop 29 is arrested by the abutment 30 on the cup 17, and the swing of the arm 16 about the axis OP is stopped. The spring in the spring carrier 51 now commences to unwind, swinging the tool carrier 6 about the axis OQ and causing the tool 5 to follow the radius fillet section B. At the end of this section, the stop on the carrier 51 meets the appropriate abutment on the fixed cup 50, and the swing of the tool about the axis OQ is arrested at the start of the linear section C.

Continued application of a reverse torque on the drum 58 produces the same effect as, but in the opposite sense to, the initial application of forward torque already described, the restraints of 20, 51 preventing any rotation of the rotary articulators represented by the bearings 9 and 10 until the linear slide 13 has moved across to its other stops, thus causing the tool 5 to follow the peripheral section C of the complex profile.

The restraints are now overcome in the same order as in the case of forward torque application, so that the tool first swings about the axis OQ to traverse the other radius fillet section D and then through the final arc about the axis OP to traverse the rear surface section E. If the reverse torque at the drum 58 is now removed, the restraints at 20, 51 will return the tool 5 to the linear section C, where it will remain until the next truing operation. It will be understood, of course, that the tool carrier 6 may be positively held, during its inoperative periods, at the extremity of either section A or section E against the restraints at 20, 51, if preferred.

The restraints may take various alternative forms if desired, such as pneumatic servos or the like, or friction couplings having graded frictional resistances to relative motion between the coupled elements. Where part of the traverse of the tool 5 is in the vertical plane, the necessary restraint may be provided by gravity.

Figure 15:
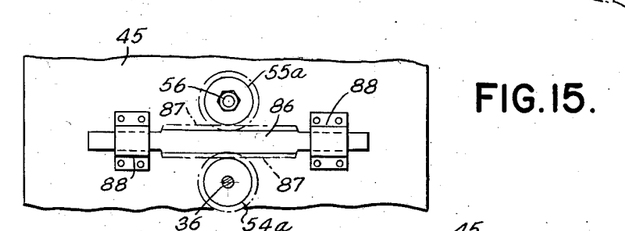
Figure 15 is a fragmentary view in elevation, similar to Figure 6, of a modified form of drive.

The drive at 54, 55, which combines both rotary and translatory motion, is suitable where the translatory displacements envisaged are small. For large linear displacements, an arrangement such as that shown in Figure 15 or Figure 16 may be adopted. In Figure 15, the shafts 36, 56 carry respective pinions 54a, 55a of smaller diameter than the pinions 54, 55 which mesh with teeth 87 on opposite sides of a double-sided rack 86 which is free to slide in end bearings 87 on the mounting 45. While the resistance to rotation of the shaft 36 is higher than the resistance to translation of the mounting 45 on its linear bearings 11, the rack 86 remains stationary, and the lateral reaction thrust on the bearings for the drive shaft 56 moves the mounting 45 until it is arrested by its appropriate stop 75. Continued rotation of the drive shaft 56 now compels the shaft 36 to rotate the articulators 9, 10 in their predetermined sequence.

Figure 16:
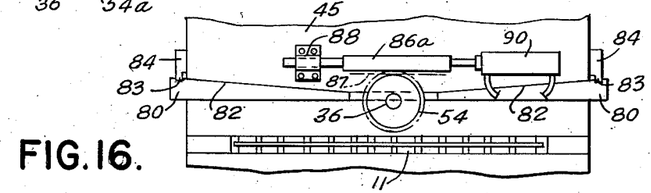
Figure 16 is a fragmentary view in elevation of a modification of Figure 15.

In Figure 16, the pinion 54 is engaged by a single-sided rack 86a, one end of which is mounted in a bearing 88 whilst the other end is secured to the ram 89 of an hydraulic motor 90 carried on the mounting 45. So long as the shaft 36 can rotate, the motor 90 drives it through the rack 86a. When, however, the shaft 36 is arrested by the stops on the rotary articulators 9, 10, the motor 90 is constrained to move, carrying with it the mounting 45 on the linear bearing 11.

Where the sequence of tool displacements is not dictated by the profile to be traversed—as it is in the case of a grinding wheel considered above—the sequence can be altered to suit particular requirements by simply varying the relative strengths of the several restraints, and adjusting the various stops as necessary.

The tool 5 is adjustable in its carrier 6, and the entire assembly can be positioned on the machine so that any radius fillet can be accommodated, down to zero—i. e. a sharp corner or edge. The latter requirement is met by setting of the tool 5 beyond the axis OQ so that it swings away from the wheel 1 when the carrier turns on the bearing 9. At the start of its subsequent traverse, the tool 5 meets the wheel face to form a sharp corner.

A device according to the invention may be designed specifically for, and form a permanent part of, a particular machine tool, or it may be provided in the form of an attachment for mounting on different machine tools. Where the device is to be used on, say a gear grinding machine, it may be used in conjunction with a face truing device according to our co-pending patent application Serial No. 516,453, filed June 20, 1955 (such a device being indicated by the chain lines 100 in Figures 1 and 2), the arrangement then being that the latter device would true the face 2 whilst the device according to the present invention would true the remainder of the profile (B—E), the tool 5 being set to carry out the traverse A idly at a small tolerance from the wheel face—say 0.0015". Alternatively, the traverse A might be omitted.

Figures 1, 8:
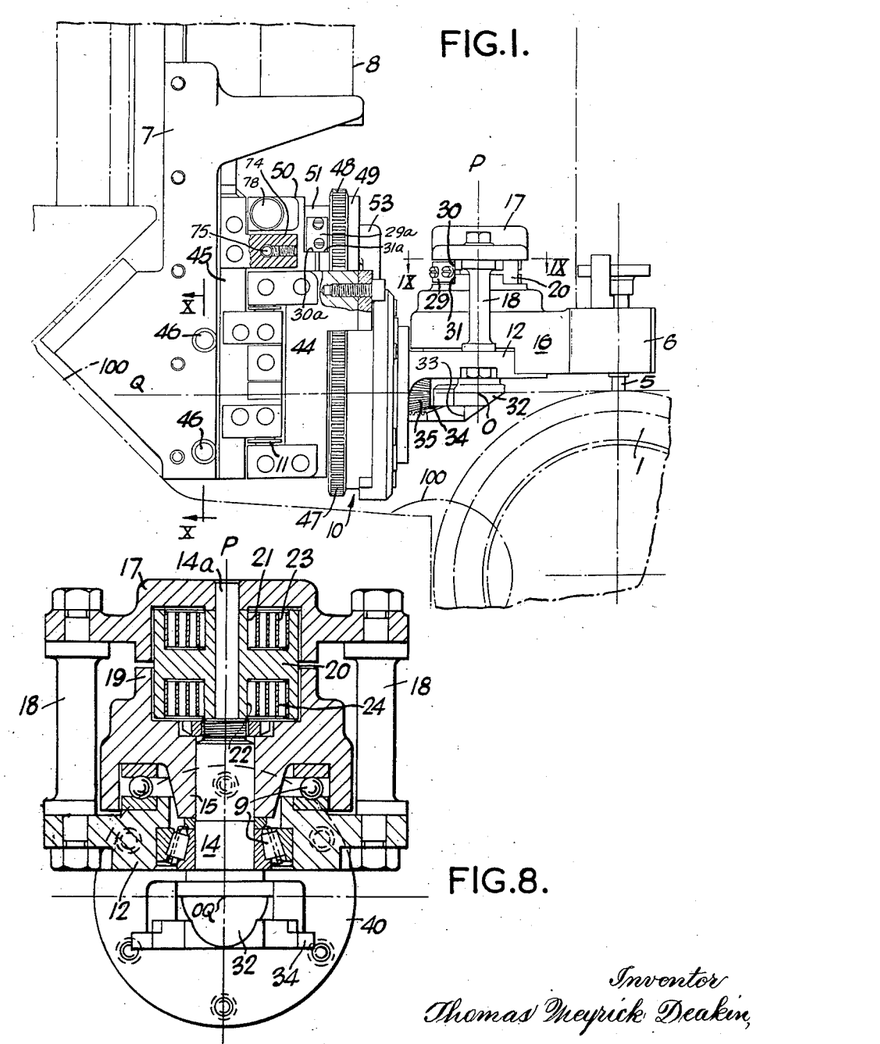
Figure 1 is a side elevation of a wheel truing attachment for a gear grinding machine.
Figure 8 is a section on the line VIII—VIII of part of the mechanism shown in Figure 2.
Figure 2:
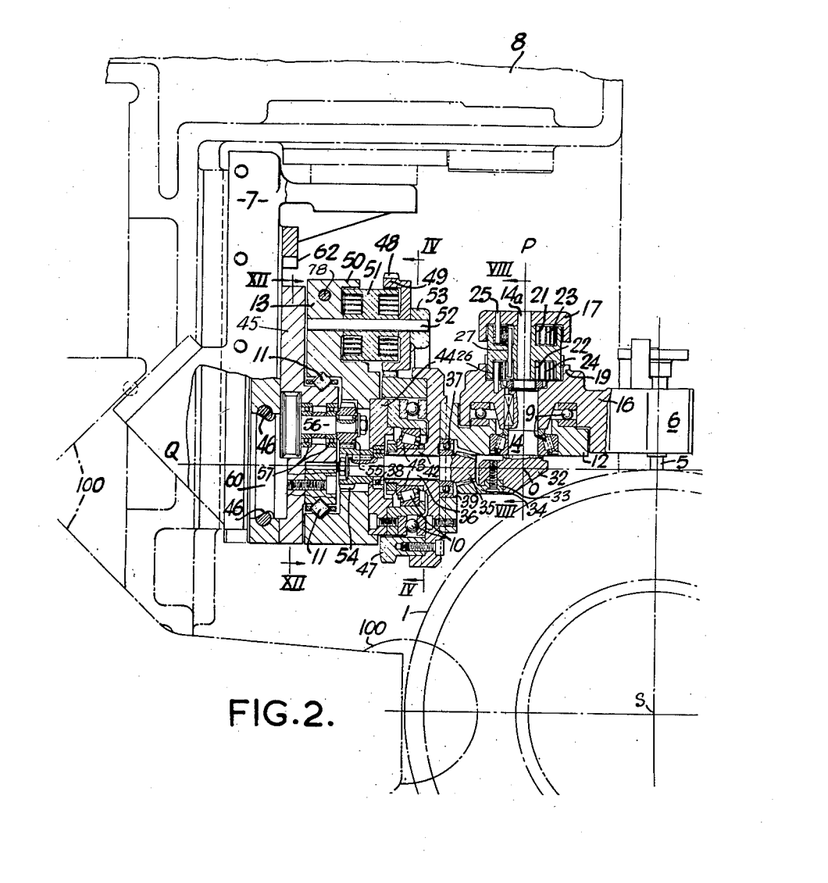
Figure 2 is a section of Fig. 4 taken along line 2—2.

Figures 2 and 4 show the wheel 1 at approximately its maximum diameter—i. e. before any, or any appreciable, reduction due to wear by the work or truing by the truing device or devices, whilst Figures 1, 7 and 13 show the wheel 1 at approximately its minimum permissible diameter—i. e. after a maximum amount of wear and truing has taken place.

What I claim is:

1. A diamond truing device for dressing grinding wheels having complex profiles wherein a diamond truing tool is mounted in a carrier supported from a relatively fixed frame part and adapted to be displaced around the contour of a complex profile through a mechanism comprising a train of articulators each having a pair of elements which are relatively displaceable in a preselected manner appropriate to a respective section of the complex profile to be traversed by the tool, at least all but one of the said articulators having associated therewith respective restraints which are graduated in intensity in the order in which the articulators are required to become operative during a traverse of the tool over the complex profile; a common drive for effecting the several relative motions between the elements of the articulators, the said drive being directly applied to one element of the articulator having the strongest restraint and the reaction thereto being taken by the articulator having the next weaker restraint, and so on (if there are more than two articulators in series) through the train of articulators to the one having the minimum restraint, at least one articulator being rotary and the restraint acting on it having a plurality of components mounted coaxially with the articulator axis, two of said components being rigid with the respective elements of the articulator whilst the third component has freedom of relative rotary motion with respect to both the other two, and a pair of oppositely acting springs each connected between the third component and a respective one of the other two components.

2. A diamond truing device according to claim 1 wherein the components of the restraint have pairs of coacting abutments defining the limits of relative motion between the third component and either of the other two components, two pairs of abutments being operative, in the zero position of relative displacement of the articulator elements, to constrain the third component of the restraint to move with one of the other two components in one direction from the zero position and with the other in the other direction.

3. Diamond truing device as claimed in claim 1 wherein the restraint assembly comprises a first component rigid with one element of the articulator; a second component rigid with the other element of the articulator; a third component rotatable with respect to the said first and second components and having lost-motion connection with each; coacting abutments on the said third and first components and the said third and second components for defining a zero position of the articulator; and springs mounted between the said third component and each of the other two for biasing the three components to the zero position.

4. A diamond truing device comprising a tool head, a fixed frame part and a jointed linkage for articulating the tool head to the frame part with a plurality of degrees of freedom of relative motion therebetween, wherein the linkage comprises an arm rigid with the tool head, a bracket, a first and rotary articulator coupling the arm to the bracket with freedom of relative angular motion therebetween in one plane, a slide, a second and rotary articulator coupling the bracket to the slide with freedom of relative angular motion therebetween in a plane normal to the first-mentioned plane, a fixed frame part, a third and linear articulator coupling the slide to the frame part with freedom of linear relative motion therebetween, a first spring restraint connected between the said arm and the said bracket and a second spring restraint connected between the said bracket and the said slide, the said springs having different strengths for determining the order in which the first and second rotary articulators become operative upon application of a driving effort to the articulator having the strongest restraint.

5. A diamond truing device according to claim 4 wherein adjustable clamping means is interposed between the third and linear articulator and the fixed frame part for varying the angle of inclination of the direction of linear motion of the slide.

6. A diamond truing device comprising a tool head and a fixed frame part, a jointed linkage for articulating the tool head to the frame part with a plurality of degrees of freedom of relative motion therebetween, an articulator at each joint in the linkage for defining the appropriate degree of freedom of relative motion of the adjacent elements of the linkage, a restraint associated with each of at least all but one of the articulators, at least one restraint comprising a pair of oppositely acting springs arranged to bias the elements coupled by the associated articulator to a zero position of relative deflection intermediate opposite limit positions of such relative deflection, the strengths of the several restraints being graded in increasing magnitude in the order in which it is required that the articulators become operative, and a common drive connected through the articulators to the one having the strongest restraint associated therewith.

References Cited in the file of this patent

UNITED STATES PATENTS

| 1,827,659 | Jung | Oct. 13, 1931 |
| 2,068,611 | Schuborg | Jan. 19, 1937 |
| 2,092,895 | Stevens | Sept. 11, 1937 |
| 2,302,712 | O'Neill | Nov. 24, 1942 |
| 2,401,562 | Gruenberg | June 4, 1946 |